(12) United States Patent
Smith et al.

(10) Patent No.: US 10,480,980 B2
(45) Date of Patent: Nov. 19, 2019

(54) HUMAN MACHINE INTERFACE FOR A REMOTE TERMINAL UNIT

(71) Applicant: Relevant Solutions, LLC, Fort Worth, TX (US)

(72) Inventors: Matthew G. Smith, Fulshear, TX (US); Andrew D. Hutson, Mesa, AZ (US)

(73) Assignee: Relevant Solutions, LLC, Fort Worth, TX (US)

( * ) Notice: Subject to any disclaimer, the term of this patent is extended or adjusted under 35 U.S.C. 154(b) by 0 days.

(21) Appl. No.: 15/620,706

(22) Filed: Jun. 12, 2017

(65) Prior Publication Data

US 2017/0356780 A1    Dec. 14, 2017

Related U.S. Application Data

(60) Provisional application No. 62/349,598, filed on Jun. 13, 2016.

(51) Int. Cl.

| | | |
|---|---|---|
| *G01F 1/00* | (2006.01) | |
| *G01F 7/00* | (2006.01) | |
| *G01F 15/06* | (2006.01) | |
| *G01D 4/00* | (2006.01) | |

(52) U.S. Cl.
CPC ........... *G01F 15/068* (2013.01); *G01D 4/002* (2013.01); *Y02B 90/241* (2013.01); *Y04S 20/32* (2013.01)

(58) Field of Classification Search
CPC ........... G01F 15/068; G01F 1/34; G01F 1/696
USPC .......................................................... 702/47
See application file for complete search history.

(56) References Cited

U.S. PATENT DOCUMENTS

| | | |
|---|---|---|
| 7,376,521 B2 | 8/2008 | James et al. |
| 7,748,450 B2 | 7/2010 | Mundell |
| 8,626,466 B2 | 1/2014 | Hackett, III et al. |
| 2002/0161866 A1 | 10/2002 | Tozer et al. |
| 2006/0129336 A1 | 6/2006 | Pretlove et al. |
| 2007/0198221 A1 | 8/2007 | James et al. |
| 2009/0007968 A1* | 1/2009 | Knecht .................... F17D 5/02 137/15.11 |
| 2009/0166034 A1 | 7/2009 | Mundell |
| 2010/0161138 A1 | 6/2010 | Lange et al. |
| 2011/0196624 A1 | 8/2011 | Hackett, III et al. |
| 2011/0196625 A1 | 8/2011 | Sheila-Vadde et al. |

(Continued)

FOREIGN PATENT DOCUMENTS

JP     2007219727 A     8/2007

OTHER PUBLICATIONS

PCT International Search Report and Written Opinion; PCT/US2017/037307; dated Sep. 12, 2017.

*Primary Examiner* — Michael P Nghiem
(74) *Attorney, Agent, or Firm* — Pramudji Law Group PLLC; Ari Pramudji

(57) ABSTRACT

Various implementations described herein are directed to a petrochemical measurement system. A remote terminal unit includes a network data server. A human machine interface may be an autonomous network data client in communication with the remote terminal unit. The human machine interface may include: a memory having configuration parameter software stored thereon; a user interface configured to receive configuration parameter input using the configuration parameter software; and a processor configured to send the configuration parameters received from the user interface of the HMI to the remote terminal unit.

13 Claims, 11 Drawing Sheets

(56) References Cited

U.S. PATENT DOCUMENTS

| | | | |
|---|---|---|---|
| 2012/0010831 A1* | 1/2012 | Kagan | G01D 4/004 |
| | | | 702/60 |
| 2012/0085434 A1 | 4/2012 | Powanda | |
| 2012/0259435 A1 | 10/2012 | Ramsay | |
| 2013/0295859 A1 | 11/2013 | Parent et al. | |
| 2013/0304234 A1 | 11/2013 | Szurek et al. | |
| 2015/0177708 A1 | 6/2015 | Mcdonald et al. | |
| 2015/0261398 A1 | 9/2015 | Madden et al. | |
| 2015/0261601 A1 | 9/2015 | Madden et al. | |
| 2016/0097666 A1 | 4/2016 | Wise | |
| 2017/0090467 A1 | 3/2017 | Cincea et al. | |
| 2017/0184641 A1* | 6/2017 | Cook | G01R 15/18 |

\* cited by examiner

HUMAN MACHINE INTERFACE FOR A REMOTE TERMINAL UNIT

CROSS-REFERENCE TO RELATED APPLICATIONS

This application claims the benefit of and priority to U.S. Patent Application Ser. No. 62/349,598, filed 2016 Jun. 13 and which is herein incorporated by reference.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

The American Gas Association (AGA) provides rules on the transfer of gasoline. Companies that obtain gasoline must follow a strict liquid custody transfer flow. The AGA has protocols to use based on metering type, e.g., differential or turbine based meter. AGA protocols dictate how companies pay taxes and how those companies are allowed to charge customers. The flow computer is very sophisticated because it has to be programmed to implement AGA rules.

Custody transfer happens when someone sells a form of energy, e.g., propane, butane, ethyl gas, gasoline. This sale is governed by the AGA. By law, companies must implement a flow computer. AGA rules include detailed protocol(s) for how to measure gas flow.

In many cases, consultants are needed to install, calibrate and operate systems. In some cases, one custody transfer meter may be implemented but multiple custody transfer-like meters may be needed so that customers are able to know how much they are paying.

Some challenges encountered by technicians in the field include not having AGA expertise and not having computer expertise to get the flow computers up and running. Many technicians don't have the capability to hook up laptops with complicated software and input the calculations required or the setup required to run an AGA calculation.

For present day systems, a computer, i.e., a laptop, is needed, a software package must be bought and loaded onto a computer, and a technician must go out into the field. While in the field, the technician must enter a large amount of data to make sure that the computer functions properly.

SUMMARY

Described herein are various implementations of a petrochemical measurement system. In one implementation, a remote terminal unit includes a network data server. A human machine interface may be an autonomous network data client in communication with the remote terminal unit. The human machine interface may include: a memory having configuration parameter software stored thereon; a user interface configured to receive configuration parameter input using the configuration parameter software; and a processor configured to send the configuration parameters received from the user interface of the HMI to the remote terminal unit.

The human machine interface can be programmed separately from the remote terminal unit and operate independently of the remote terminal unit. The human machine interface and the remote terminal unit can be integrated in a housing. The human machine interface may be located remote from the remote terminal unit. The human machine interface may be integrated in a housing with the remote terminal unit and at least one other human machine interface may be located remotely from the housing.

In one implementation, the human machine interface and the at least one other human machine interface may include a plurality of human machine interfaces that are simultaneously connected to the remote terminal unit. In one implementation, the plurality of human machine interfaces may be synchronized.

The remote terminal unit may be configurable using Modbus communications. In one implementation, the petrochemical measurement system includes a monitoring and/or control system that maintains a configuration library for a plurality of flow meters. The monitoring and/or control system can configure a new flow meter using information stored in the configuration library.

In one implementation, the monitoring and/or control system configures the new flow meter by copying contents of a specific block of Modbus registers in a database of the monitoring and/or control system. In one implementation, the monitoring and/or control system configures the new flow meter by pushing configuration data to the new flow meter from the monitoring and/or control system.

The configuration parameter input may be a particular type of flow calculation and/or measurement. In one implementation, the particular type of flow calculation and/or measurement includes at least one of a flow rate, a temperature and a pressure.

The configuration parameter input may be a connection method. In one implementation, the connection method can be a current loop. In another implementation, the connection method can be Modbus serial communication. In yet another implementation, the connection method can be an integrated wireless device manager.

The configuration parameter software may include preprogrammed connection profiles for a plurality of devices. The remote terminal unit may include a built-in Highway Addressable Remote Transducer over Internet Protocol (HART-IP) interface.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

One or more implementations of various techniques for providing a flow computer will now be described in more detail with reference to FIGS. 1-13 in the following paragraphs.

The present disclosure provides a petrochemical measurement system that provides a push-button-based setup from a touch screen human machine interface (HMI). The present disclosure allows a user to set everything up in a touch screen environment using wizards versus using software loaded on a laptop. All of the information required to set up and measure gas flow can be done from a touch screen.

Currently some older technicians are not computer savvy. In addition, laptops used in prior art can create sparks and cause explosions in gaseous locations. The present disclosure eliminates the need for technicians to bring a laptop and in addition eliminates the need for the technician to bring a gas meter to guard against potential explosions associated with sparks from laptops.

Conventional petrochemical measurement systems, typically include a laptop connected to a remote terminal unit (RTU), which is also called a flow computer. Specialized software, e.g., configuration software, is installed on the laptop to communicate with and to configure the RTU. The laptop communicates using specialized original equipment manufacturer (OEM) software loaded on the system communicating over a specialized network. The specialized software is used with a specialized driver. The laptop is usually connected by wire (serial or Ethernet). There is usually not a wireless connection due to security concerns related to wireless data.

The RTU has the ability to handle any number of signals from meters that exist out in the field. Those signals can be converted into a digital format and transmitted to a remote location so that they can be monitored remotely. The RTU is connected to a transmitter to transmit a signal from the flow. They take the energy from the flow and convert it to an analog signal, digital signal, etc.

Figure 2:
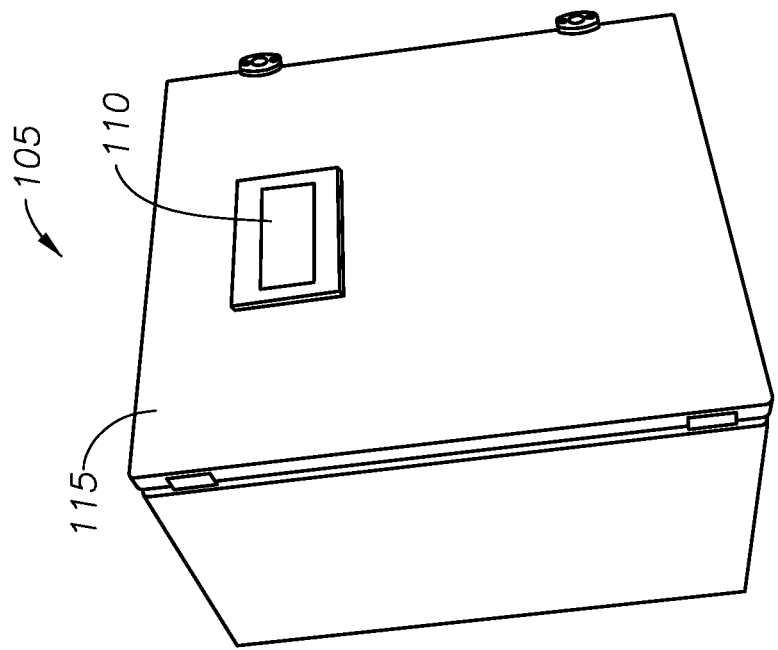
FIG. 2 illustrates a perspective view of the flow computer of FIG. 1 in accordance with implementations of various techniques described herein.
Figure 1:
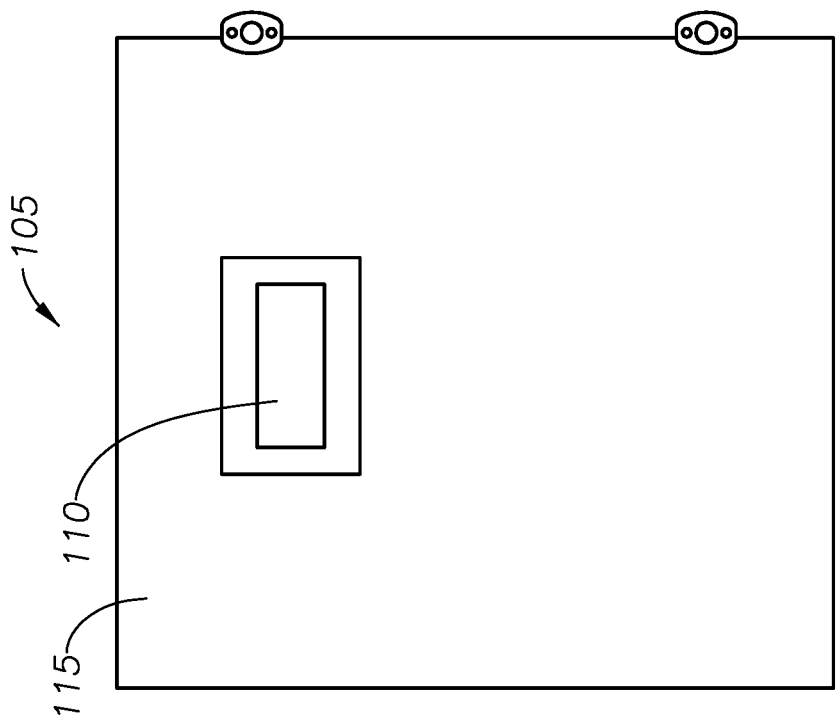
FIG. 1 illustrates a front view of a flow computer in accordance with implementations of various techniques described herein.

FIG. 1 illustrates a front view of a flow computer in accordance with implementations of various techniques described herein. The flow computer is embodied in a cabinet 105. Cabinet 105 includes a HMI 110 installed within a door 115 of cabinet 105. FIG. 2 illustrates a perspective view of the flow computer of FIG. 1.

Figure 3:
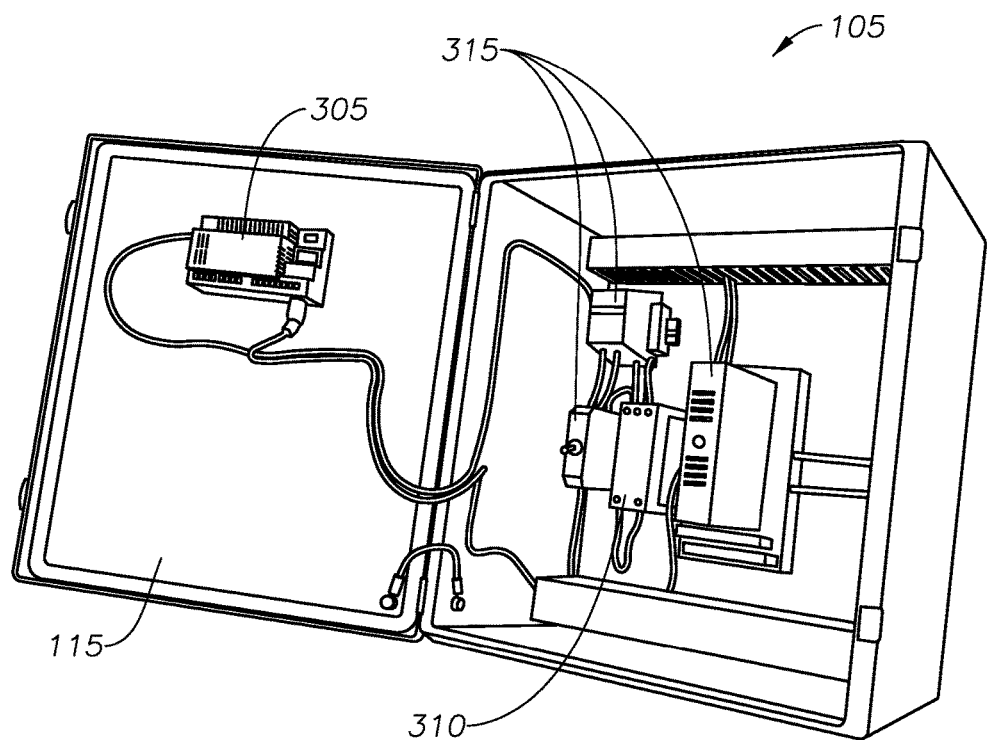
FIG. 3 illustrates a front view of the flow computer of FIG. 1 with the door of the unit open in accordance with implementations of various techniques described herein.
Figure 4:
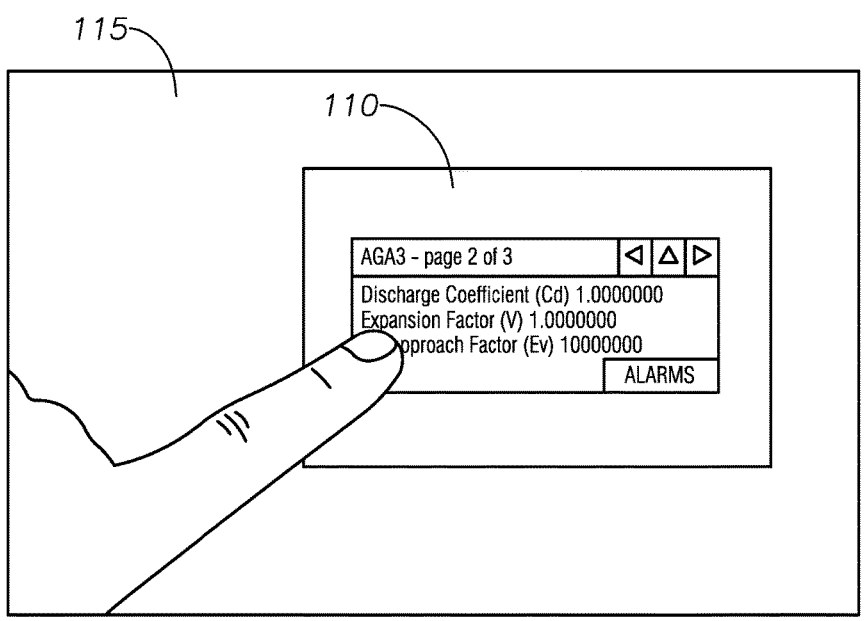
FIG. 4 illustrates a view of the Human Machine Interface (HMI) of the flow computer of FIG. 1 in accordance with implementations of various techniques described herein.

FIG. 3 illustrates a front view of the flow computer of FIG. 1 with the door of the unit open in accordance with implementations of various techniques described herein. A rear portion 305 of HMI 110 is shown installed in door 115 of cabinet 105. Included within cabinet 105 is RTU 310 and power distribution infrastructure 315. The HMI 110 is coupled to the RTU 310 with wire/cable. FIG. 4 illustrates a view of the HMI 110 of the flow computer of FIG. 1.

Figure 5:
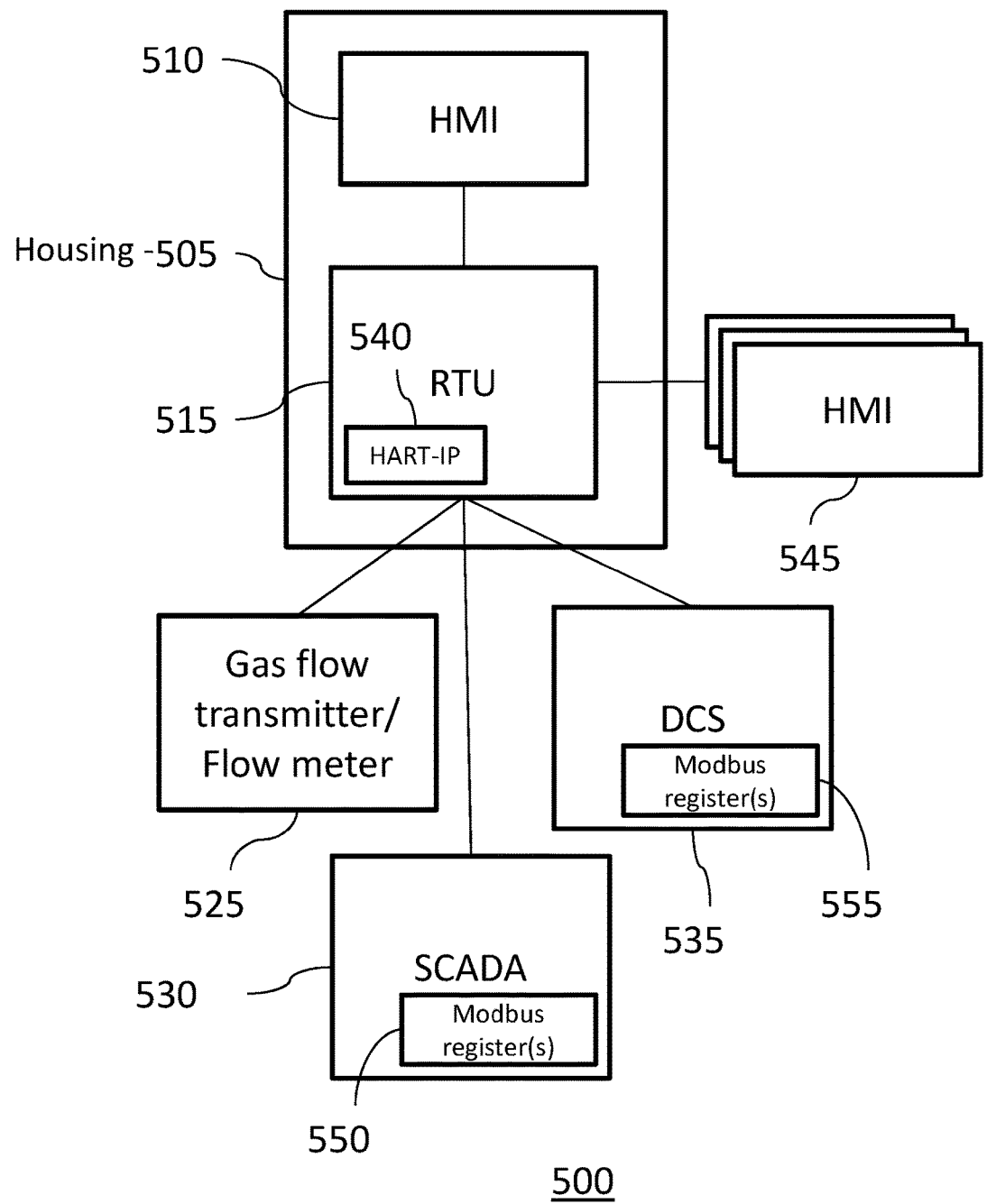
FIG. 5 illustrates a diagram of a petrochemical measurement system in accordance with implementations of various techniques described herein.

FIG. 5 illustrates a diagram of a flow computer based petrochemical measurement system 500 in accordance with implementations of various techniques described herein. FIG. 5 includes an HMI 510 coupled to RTU 515 within a housing 505. Input/output device(s) 525 are coupled to RTU 515. The input/output device(s) 525 can be electrically or physically coupled to the RTU 515.

The RTU is a microprocessor-controlled electronic device that interfaces objects in the physical world to a distributed control system or SCADA (supervisory control and data acquisition) system by transmitting telemetry data to a master system, and by using messages from the master supervisory system to control connected objects. Another term that may be used for RTU is remote telecontrol or a remote telemetry unit.

The RTU is made up of a processor, inputs/outputs, and communications. The inputs/outputs provide a way for the RTU to communicate to the outside world, e.g., to transmitters that the user has connected to their pipeline. The RTU interfaces with devices in the physical world, e.g., flow transmitters, turbine flow meters, ultrasonic flow meters.

A supervisory control and data acquisition (SCADA) system is a computer sitting in someone's office oftentimes miles away from the flow meter. The SCADA receives a signal from the flow meter and provides a graphical representation so that a user sitting at a desk miles away can see pertinent information, e.g., gas flowing at a certain cubic feet/minute. The SCADA gives the user a way of visualizing what is happening out in the field. The RTU takes a signal, e.g., an electrical signal from the flow meter or other measurement device in the field, and converts the signal into a digital/computer signal. The RTU sends the digital/computer signal to the SCADA, which provides visualization on a remote screen.

In one implementation, gas flow transmitters or flow meters 525 provide measurement information to the RTU 515, which may be connected to SCADA system 530. In another implementation, control information, e.g., a signal to open/close a valve, turn on/off a pump or display information, is communicated from the HMI 510 through the RTU 515 to a distributed control system (DCS) 535. Communication between the RTU and devices 525, 530, 535 may be one-way or two-way depending on the desired implementation. The RTU 515 may further include a built-in Highway Addressable Remote Transducer over IP (HART-IP) interface 540. The HART-IP interface is described in more detail below.

The flow computer may store numerous granular configuration information/factors, such as, pipe diameter, pipe material, e.g., carbon steel, stainless steel, or other materials, in its memory. The granular information may include any items quantifiable enough to be collected as determined by the AGA. Further information may include connections in the pipes, e.g., flanges, temperature of the gas flowing through the pipe, moisture content secondary elements mixed in with gas that are not considered product, e.g., contaminants profile. All of these items can be entered from the front panel of the HMI.

In order to set up the configuration software, the user may need to know which AGA governing body is to be used, e.g., AGA3, AGA6, AGA12, etc. The selection of AGA governing body is dictated by the device that is to be used. The user may select a plurality of parameters. In one implementation, the user may select a signal type of the instrumentation, e.g., analog, digital, or pulse signals. The signal type may be set up on the RTU from the HMI.

The HMI allows an operator to interface with a control system. For instance, the HMI 510 includes a display, a communication protocol that communicates with the RTU or DCS or any other type of peripheral device, a processor and a memory. The RTU 515 has the detailed logic that receives gas flow signals, performs calculations and determines a flow rate.

In one implementation, communications between the HMI and RTU may be set up using a client-server architecture. The touchscreen HMI is an 'autonomous' device, e.g., a network data client. The RTU may be a network data server. The HMI may be programmed separately from the RTU and operates independently of the RTU.

In one implementation, the HMI may be physically relocated to be remote from the main flow computer housing. For example, in one implementation, the main housing may be situated near the pipeline and attached meters, while the HMI may be located potentially many miles away and connected to the RTU via common industry network/wireless link architecture.

In one implementation, a plurality of HMIs 510, 545 may be connected to a single flow computer simultaneously, e.g., a local HMI may be located in the housing while a second unit is located in a control room. The plurality of HMIs are synchronized in true client-server fashion, as long as the plurality of HMIs remain connected via any viable Ethernet-compatible link.

In another implementation, the flow computer may be 100% configurable via Modbus communications. Every single setup parameter may be exposed, e.g., made available, to an addressable Modbus holding register. Exposing each setup parameter to an addressable Modbus holding register 550, 555 maintained by a monitoring and/or control system, e.g., the SCADA and/or DCS, allows the monitoring and/or control system to maintain a configuration library for an unlimited number of units, e.g., flow meters or other measurement and/or metering devices. The monitoring and/or control system is able to configure a new flow meter using information stored in the configuration library. The monitoring and/or control system is able to 'snapshot', e.g., copy the contents, of a specific block of Modbus registers 550, 555 in a database of the monitoring and/or control system.

This snapshot feature is implemented using the address map of the flow meter that is published with the product documentation for the flow meter. The snapshot data may be stored by the monitoring and/or control system in a database of the monitoring and/or control system using any desired method. Using this snapshot feature, a new or replacement unit can be duplicated from an existing one by taking a saved 'data snapshot', and simply copying and pasting the snapshot to another unit's address map. The contents of the snapshot are stored by pushing the snapshot data out to the new and/or not yet configured unit from the monitoring and/or control system. Pushing the snapshot data out to a new unit can be accomplished in a matter of milliseconds. In one implementation, the protocol used to configure the flow computer can be Modbus-TCP and can work equally well with any system that supports Modbus. In one implementation, the snapshot feature can be done remotely.

In yet another implementation, the HMI 510 may be programmed to display information that would normally be sent to a SCADA. The HMI 510 may request information from the RTU 515, e.g., current rate of flow. The RTU 515 will respond and the HMI 510 will take that response signal and turn it into a graphic and display that graphical representation, e.g., the rate of flow or some other information, on the screen. One implementation for providing information to the touchscreen HMI 510 that would normally be sent to a SCADA is described in FIG. 6.

Figure 6:
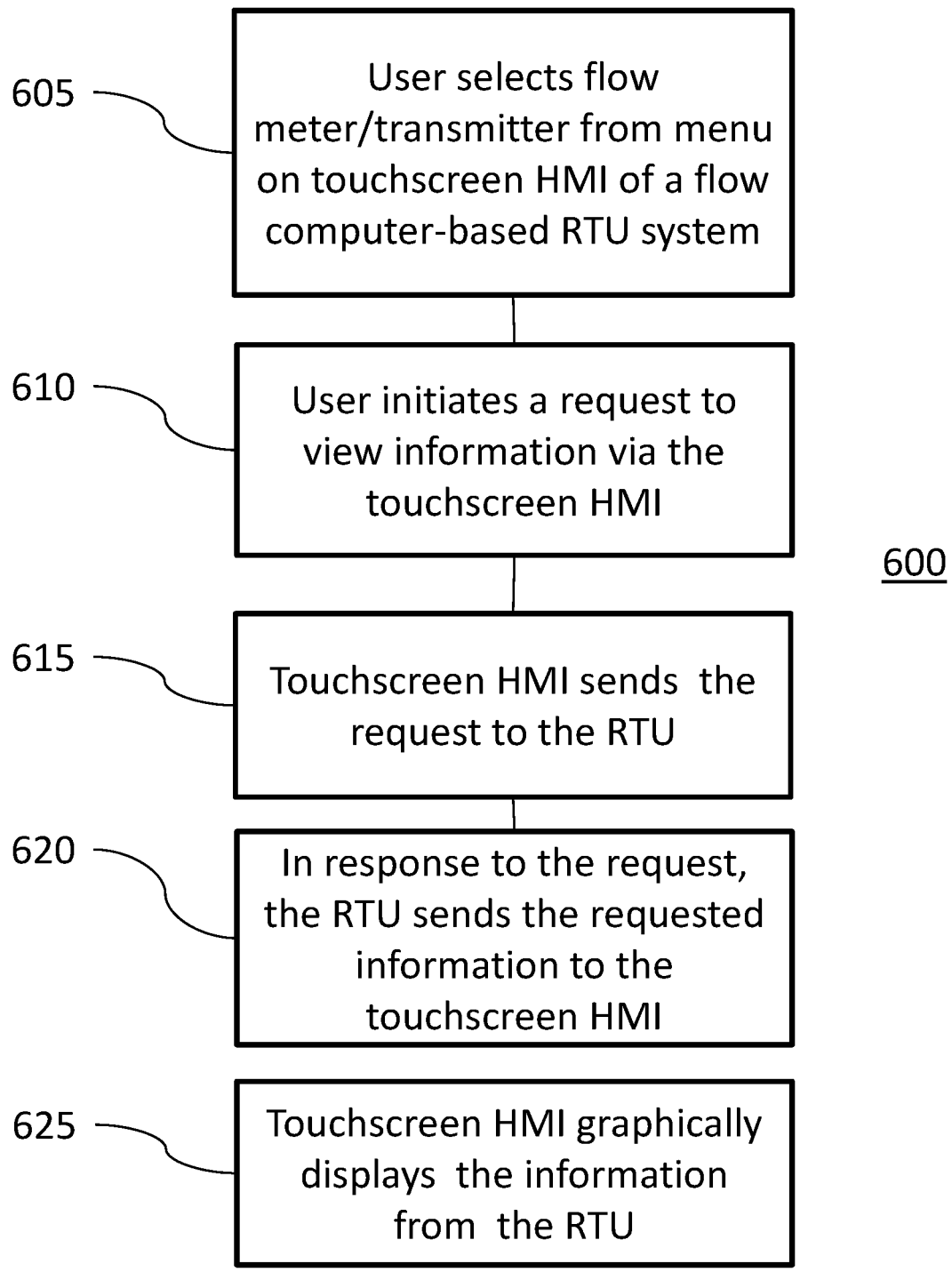
FIG. 6 illustrates a flow diagram of a method for providing information to a touchscreen HMI of a flow computer in accordance with implementations of various techniques described herein.

FIG. 6 illustrates a flow diagram of a method 600 for providing information to a touchscreen HMI of an RTU in accordance with implementations of various techniques described herein. It should be understood that while method 600 indicates a particular order of execution of operations, in some implementations, certain portions of the operations might be executed in a different order. Further, in some implementations, additional operations or blocks may be added to the method 600. Likewise, some operations or blocks may be omitted.

At block 605, a user selects a flow meter/transmitter from a menu on the touchscreen HMI of the RTU. At block 610, the user initiates a request to view information regarding the flow meter/transmitter via the touchscreen HMI. At block 615, the touchscreen HMI sends the request to the RTU. At block 620, in response to the request, the RTU sends the requested information to the touchscreen HMI. At block 625, the touchscreen HMI graphically displays the information received from the RTU.

The HMI allows the user to complete the configuration of the information the RTU will use to complete the flow calculations correctly. One example of a configuration may occur when the RTU needs to be configured to store an appropriate diameter of a pipe. However, the RTU has no way to determine that information. The user would have to go to one of the screens that are programmed in the HMI. On one of the HMI screens, a "pipe diameter" configuration screen may be shown. The user can touch the word "pipe diameter" via, e.g., a touch screen. A keypad will be brought up and the user can enter the pipe diameter. The number entered by the user will then be forwarded to the RTU for storage. One implementation of a method for configuring information to complete flow calculations is provided in FIG. 7.

Figure 7:
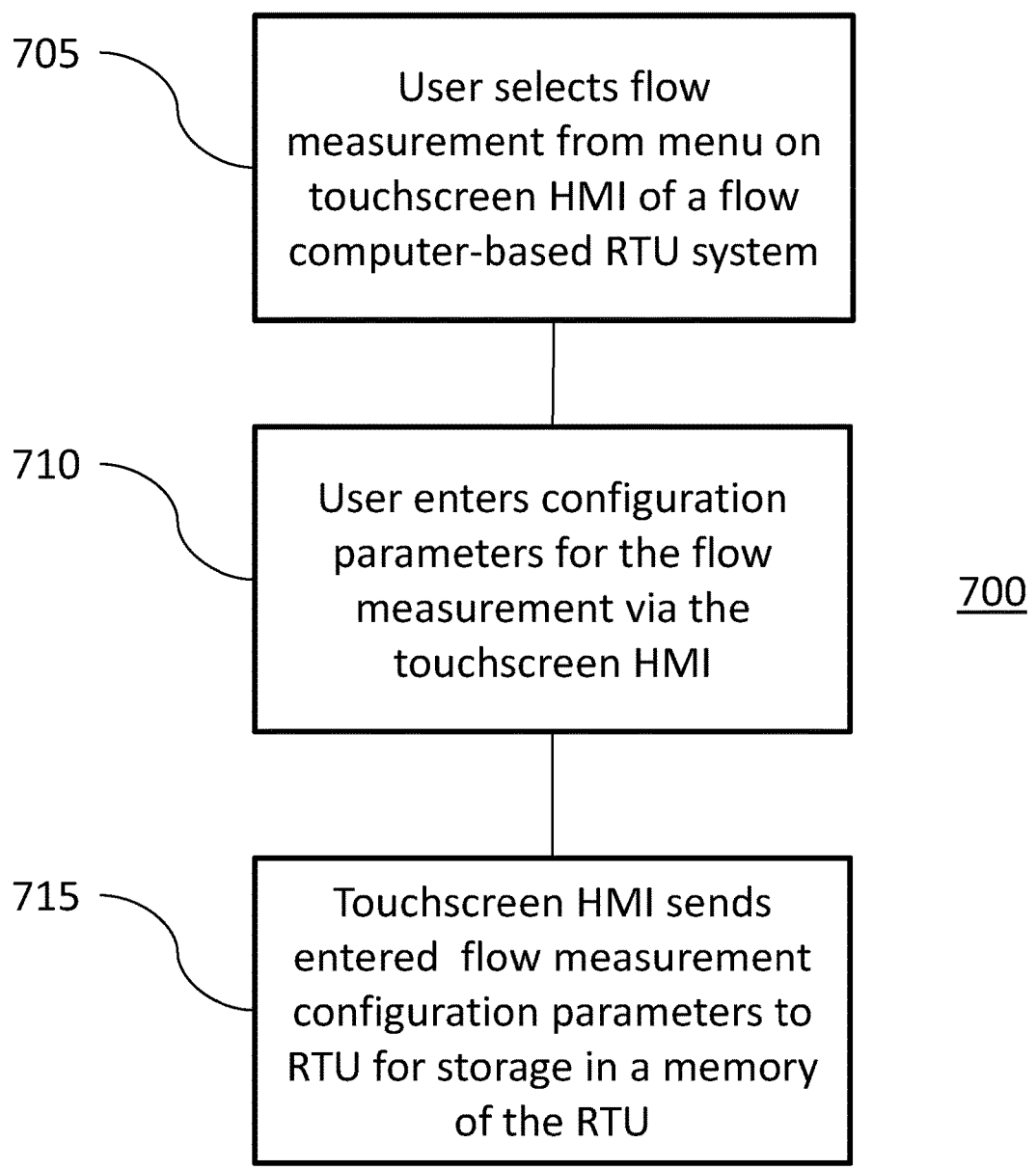
FIG. 7 illustrates a flow diagram of a method for configuration information for one or more flow calculations via a touchscreen HMI of a flow computer in accordance with implementations of various techniques described herein.

FIG. 7 illustrates a flow diagram of a method 700 for providing configuration information for one or more flow calculations via a touchscreen HMI of the RTU in accordance with implementations of various techniques described herein. It should be understood that while method 700 indicates a particular order of execution of operations, in some implementations, certain portions of the operations might be executed in a different order. Further, in some implementations, additional operations or blocks may be added to the method 700. Likewise, some operations or blocks may be omitted.

At block 705, a user selects a flow measurement from a menu on the touchscreen HMI of the RTU. At block 710, the user enters configuration parameters for the selected flow measurement on the touchscreen HMI. At block 715, the touchscreen HMI sends the entered configuration parameters to the RTU for storage in a memory of the RTU.

The HMI can provide two way communication. The HMI may display items on the screen. The HMI also allows the user to provide information for use/storage by the RTU.

The HMI may be used to set up communication from the RTU to the SCADA. The RTU can communicate to SCADA or the HMI. From the touchscreen of the HMI a user may set up parameters and provide communication with the SCADA system. The SCADA system may look for an IP address to communicate with the RTU and/or HMI. The configuration information may be assigned to a register that populates that information back to the SCADA system.

When a RTU is programmed, the RTU is set up with an IP address (network address) and some secondary identifying information, e.g., a memory map. Examples of a memory map include signal registers and register addresses. Every piece of information that the RTU keeps track of may be assigned with an address. From the SCADA end, the SCADA computer is programmed to commission a new RTU. The address on the network is decided. The SCADA system becomes aware that the new RTU is in the network and obtains information on the new RTU. When the SCADA is alerted to the new RTU, the IP address is programmed into it, secondary identifying information is provided, and a memory map is provided.

Figure 8:
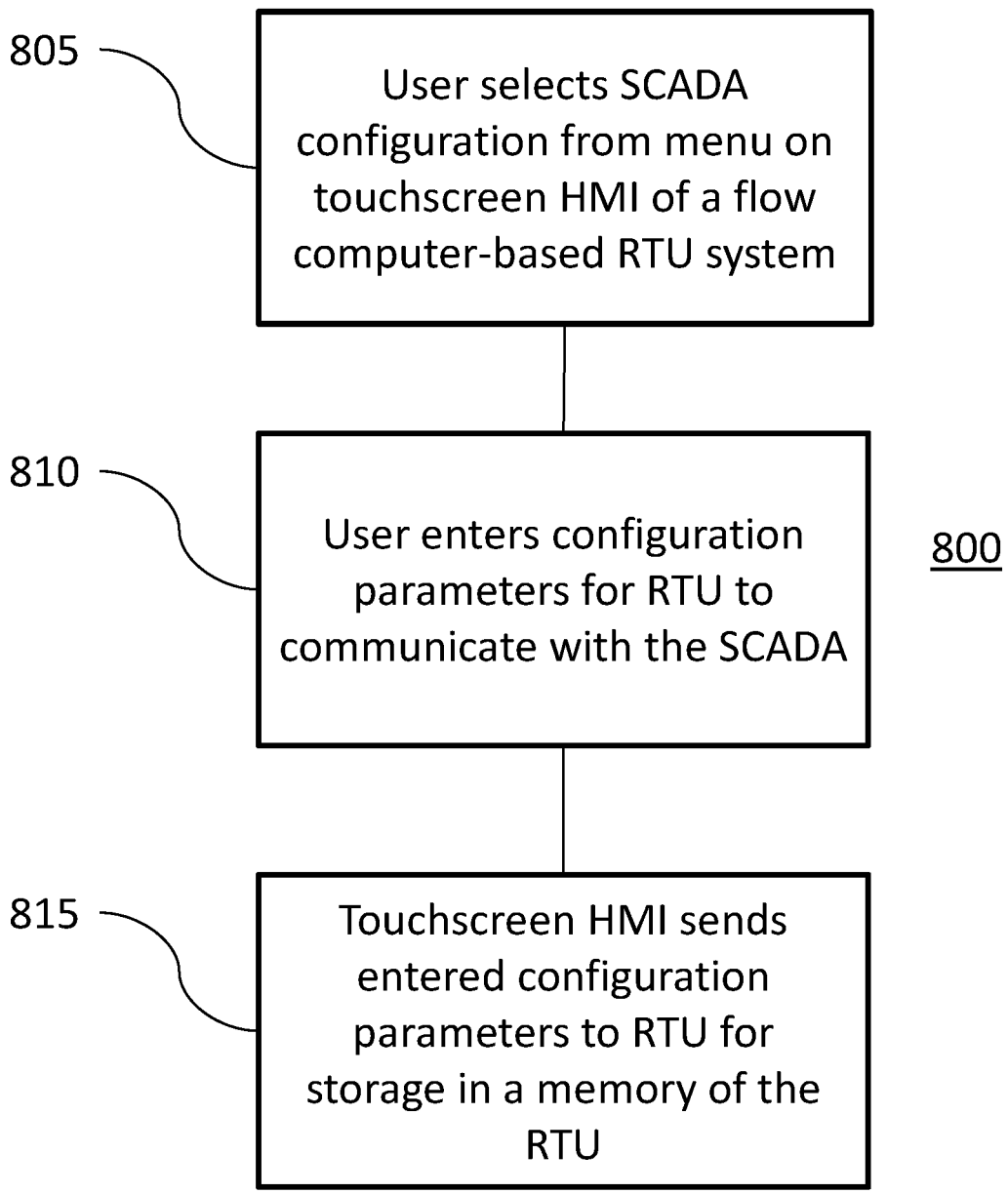
FIG. 8 illustrates a flow diagram of a method for configuring SCADA communication parameters via a touchscreen HMI of a flow computer in accordance with implementations of various techniques described herein.

FIG. 8 illustrates a flow diagram of a method 800 for configuring SCADA communication parameters via a touchscreen HMI of the RTU in accordance with implementations of various techniques described herein. It should be understood that while method 800 indicates a particular order of execution of operations, in some implementations, certain portions of the operations might be executed in a different order. Further, in some implementations, additional operations or blocks may be added to the method 800. Likewise, some operations or blocks may be omitted.

At block 805, a user selects SCADA configuration from a menu on the touchscreen HMI of the RTU. At block 810, the user enters configuration parameters for the RTU to communicate with the SCADA. At block 815, the touchscreen HMI sends the entered configuration parameters to the RTU for storage in a memory of the RTU.

An example of a SCADA receiving information from a new unit is provided below. In this example, the SCADA requests a flow rate (e.g., Flow rate #1) for a unit at a particular address (e.g., address 73). As soon as the configuration is finished, the SCADA sends a message out on the network looking for the unit and requesting certain information, e.g., Flow rate #1. The RTU sees the message and sends a response back to the SCADA. The SCADA system receives the response and provides a graphical representation of the flow rate. The address and memory map can be set up on the SCADA system side or at the RTU.

Typically, flow transmitters are mounted on the pipeline and a wire couples the transmitter to the RTU. There are several flow metering methodologies commonly used in the industry. There are magnetic flow meters, mechanical turbines that spin in the flow stream of the gas. Some flows are measured by measuring differential pressure. The RTU has the ability to adapt to whatever methodology the customer has chosen. For example, a user may decide that their organization will use magnetic flow meters. The HMI of the present disclosure allows a user, from the HMI, to go into the setup screen and use a selected meter type.

Figure 9:
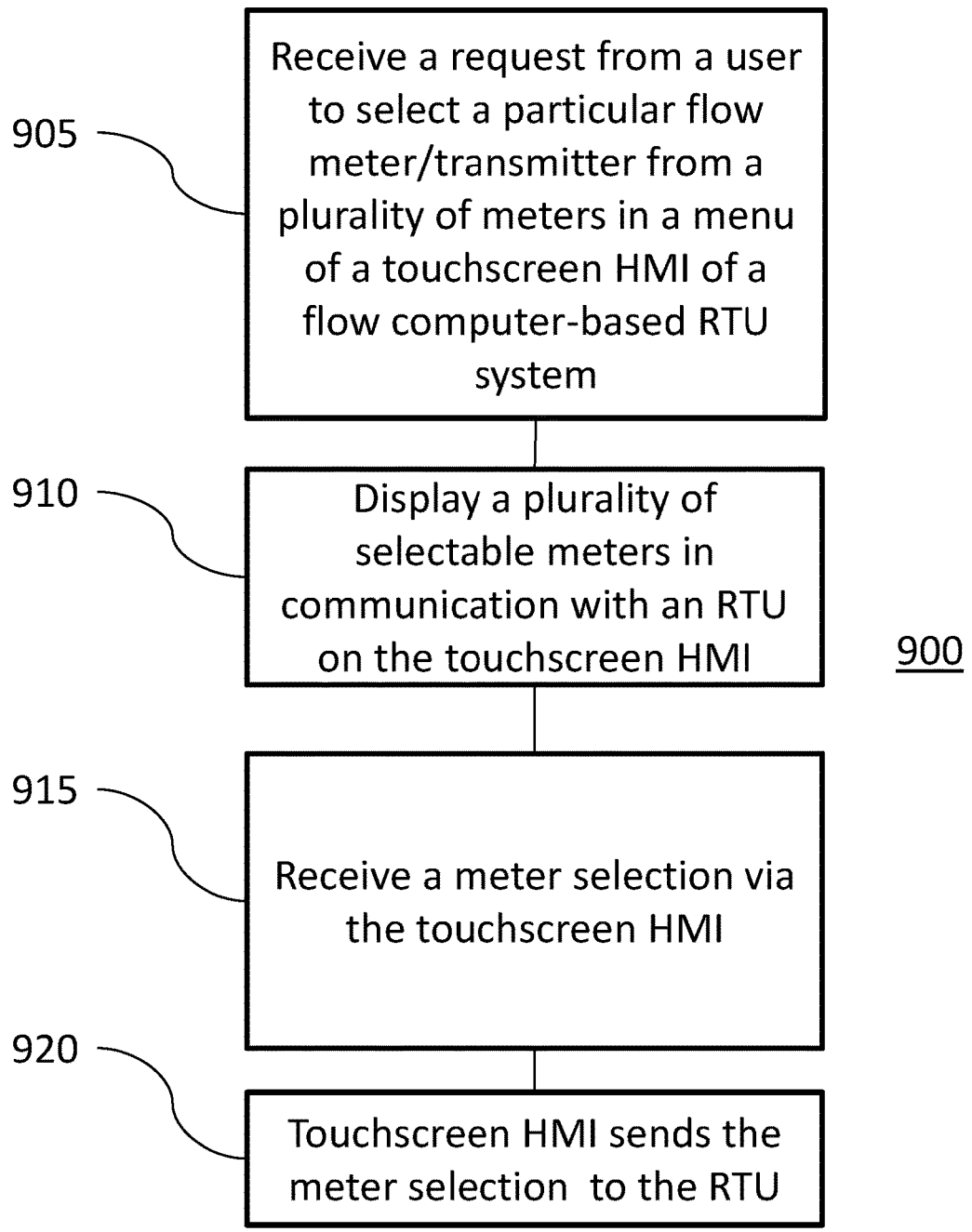
FIG. 9 illustrates a flow diagram of a method for selecting a meter type via a touchscreen HMI of a flow computer in accordance with implementations of various techniques described herein.

FIG. 9 illustrates a flow diagram of a method 900 for selecting a meter type via a touchscreen HMI of the RTU in accordance with implementations of various techniques described herein. It should be understood that while method 900 indicates a particular order of execution of operations, in some implementations, certain portions of the operations might be executed in a different order. Further, in some implementations, additional operations or blocks may be added to the method 900. Likewise, some operations or blocks may be omitted.

At block 905, a request to select a particular flow meter/transmitter from a plurality of meters in a menu of a touchscreen HMI of the RTU is received from a user. At block 910, a plurality of selectable meters in communication with the RTU is displayed on the touchscreen HMI. At block 915, a meter selection is received from the user via the touchscreen HMI. At block 920, the touchscreen HMI sends the meter selection to the RTU.

In one pipeline implementation, an existing turbine meter may stop working. If a technician desires to replace the turbine but doesn't have one, the HMI of the present disclosure allows the technician to easily select a different meter instead. The user in this case, will be able to select the profile for the different meter style from a user interface/touch screen of the HMI.

There may be multiple flow meters and multiple types of types of flow meters. For example, ultrasonic flow meter technology may read the flow. Government relations may require users to test that the ultrasonic meter is working as advertised. For example, a turbine meter that generates a pulse output may be compared to an ultrasonic output (e.g., a Modbus output) of an ultrasonic meter to determine whether the ultrasonic meter is working as advertised.

Using prior art technology, when a user desires to swap out gas flow transmitters, that user would have to find the old laptop and verify that the laptop has the latest update before you could do the swap. This requirement of the prior art technology is eliminated by the HMI-based system of the present disclosure.

In the present system, the user uses the touchscreen of an HMI to set up the new meter. The HMI of the present disclosure includes all necessary protocols. There is a suite of protocols embedded in the software of the HMI. Some example protocols include Modbus, Ethernet, and proprietary protocols.

The present HMI-based system introduces significant and unique innovations. The present system includes an intuitive color graphical touchscreen HMI. Prior art designs are clumsy, typically having a simple alphanumeric liquid crystal display (like a calculator) and a few physical pushbuttons or a keypad. The present system eliminates the need to maintain a separate laptop, software, and special cables.

Configuration software is stored in a memory of the HMI 110 on the front panel. The configuration is self-contained within the front panel. Some benefits provided by the present HMI-based system include avoiding the problem of various users where each user has a different laptop. The problem of users having different/outdated versions of software is also eliminated. Other problems that can be eliminated are users losing software, users breaking their laptops, and computer crashes.

The present HMI-based system presents all user-configurable parameters in a legible format. In one implementation, the user-configurable parameters are presented in English, however, other languages may be supported as well). Prior art systems typically have only numbered parameters, requiring the user to maintain/consult a manual that denotes what the numbered parameters signify (e.g., P052=Pipe Pressure in psi). In this regard, the present system eliminates the need to maintain a library of manuals, which is historically a challenge in industrial environments.

The present system is a self-contained design and allows 100% of the AGA setup to be performed in the field, directly through the HMI.

The present system allows a 100% local HMI setup of the pump interface and control. Pumps specific to the oil and gas industry are quite complex, so this is a significant feature.

The present system is a RTU-based design that is highly extensible/customizable. This extensible/customizable system allows for the addition of logic capable of controlling or monitoring a broad range of industrial processes. Prior art flow computers have little to no customizability.

Figure 10:
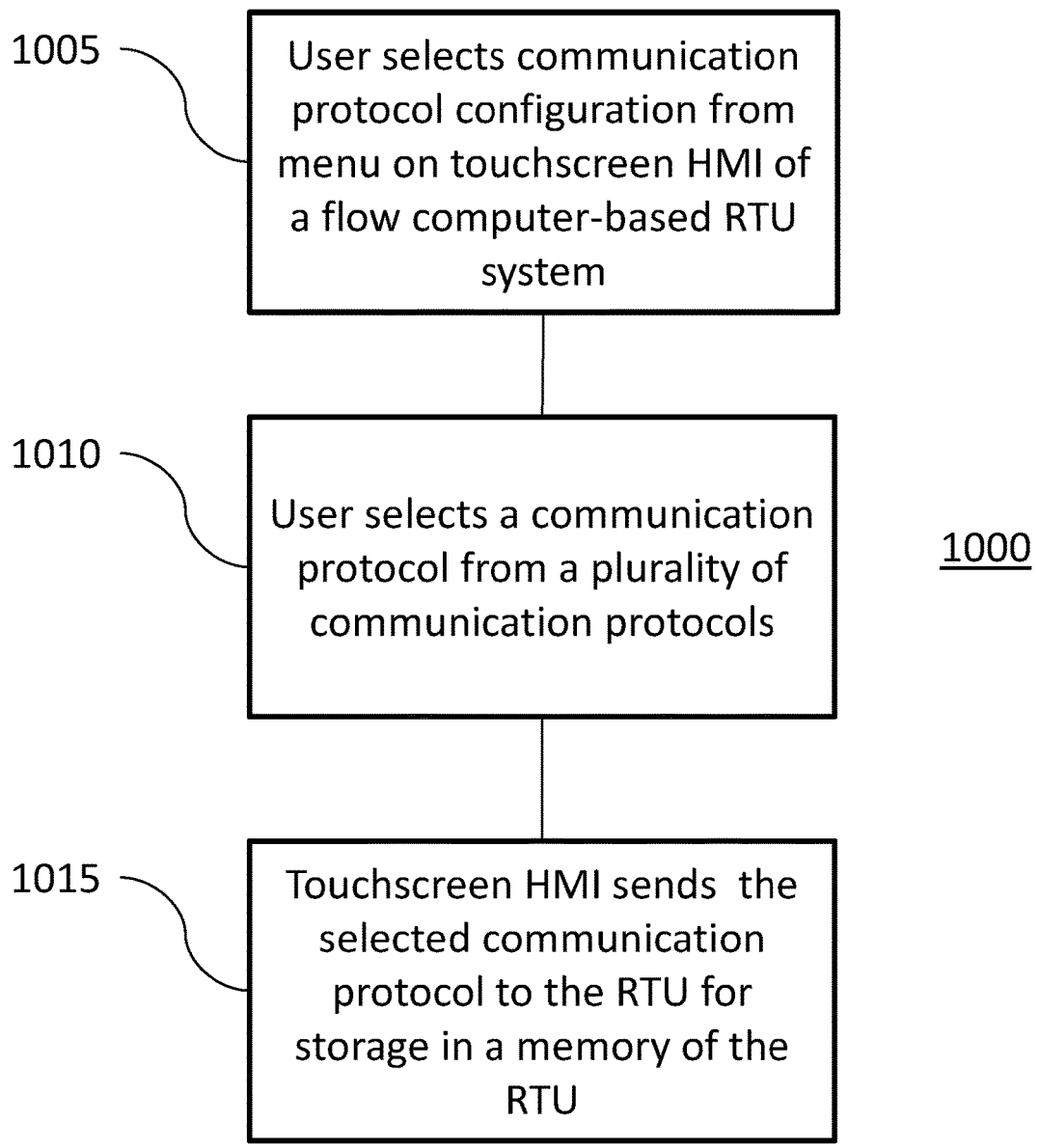
FIG. 10 illustrates a flow diagram of a method for communication protocol configuration information via a touchscreen HMI of a flow computer in accordance with implementations of various techniques described herein.

FIG. 10 illustrates a flow diagram of a method 1000 for configuring communication protocol information via a touchscreen HMI of the RTU in accordance with implementations of various techniques described herein. It should be understood that while method 1000 indicates a particular order of execution of operations, in some implementations, certain portions of the operations might be executed in a different order. Further, in some implementations, additional operations or blocks may be added to the method 1000. Likewise, some operations or blocks may be omitted.

At block 1005, the user selects communication protocol configuration from a menu of the touchscreen HMI of the RTU. In one implementation, the communication protocol is for facilitating communication between the RTU and the flow meter/transmitter. At block 1010, the user selects a communication protocol from a plurality of communication protocols, i.e., a suite of communication protocols embedded in the software of the touchscreen HMI. At block 1015, the touchscreen HMI sends the selected communication protocol to the RTU for storage in a memory of the RTU.

In one implementation, all parameters for communication and any device needing configuration to tie into a SCADA system may be accessible locally through the HMI. This includes configuration information related to communication protocols, memory maps, RTU station IDs and IP addresses.

In one implementation, multiple RTUs may share an IP address. In order to distinguish among the RTUs, a station ID may be assigned to each RTU In one implementation, a plurality of flow meters are physically coupled to the RTU. Each physical coupling point may have an assigned address. This assigned address is part of the memory map. In one implementation, the physical coupling of the plurality of flow meters to the RTU is provided by a screw.

When an RTU is shipped to a customer, a master memory map is provided. In order to find an address for a primary flow reading, the memory map is accessed to look for the primary flow reading. The user can select the address and pull up the information for the RTU.

In one implementation, 100% of the user configuration of the device is exposed through the communications protocol. In this implementation, a configured flow computer can be 'snapshotted' and archived from the SCADA or DCS system and can be replicated or replaced in the future in a very short amount of time, e.g., in a matter of milliseconds.

For example, a user scenario may have 20 HMI-based devices according to the present system, all of which will be set up the same way. However, these HMI-based devices may be set up on different physical pipelines. The user may spend perhaps 30 minutes manually configuring the first unit. After the user is sure the configuration is correct, this configuration may be replicated on the other HMI-based devices. Using the memory map supplied by the first HMI, the user can upload the entire configuration completed on the first device from the user's SCADA/DCS system, in a matter of milliseconds. This uploaded configuration may be tweaked if desired, then provided to a new, unconfigured unit in a short amount of time, e.g., in a matter of milliseconds.

In one implementation, if one unit fails, its stored configuration may be recalled and deployed into a replacement unit in a short amount of time, e.g., in a matter of milliseconds.

In one implementation, this configuration transaction may be done remotely, even with the HMI-based system mounted in an inaccessible location.

In one implementation, a user may buy a meter with a pulse input. That same meter can come with an option for a Modbus input. Using the HMI described herein, the input may be changed from a pulse input to a Modbus input. Using the HMI described herein eliminates the need for a user to use a prior art laptop to change the I/O type and reconfigure the software on the laptop to communicate using the Modbus protocol.

In one implementation, a user is able to change communication signal types of the flow transmitters, e.g., from discrete, analog, and digital, from the HMI.

Figure 11:
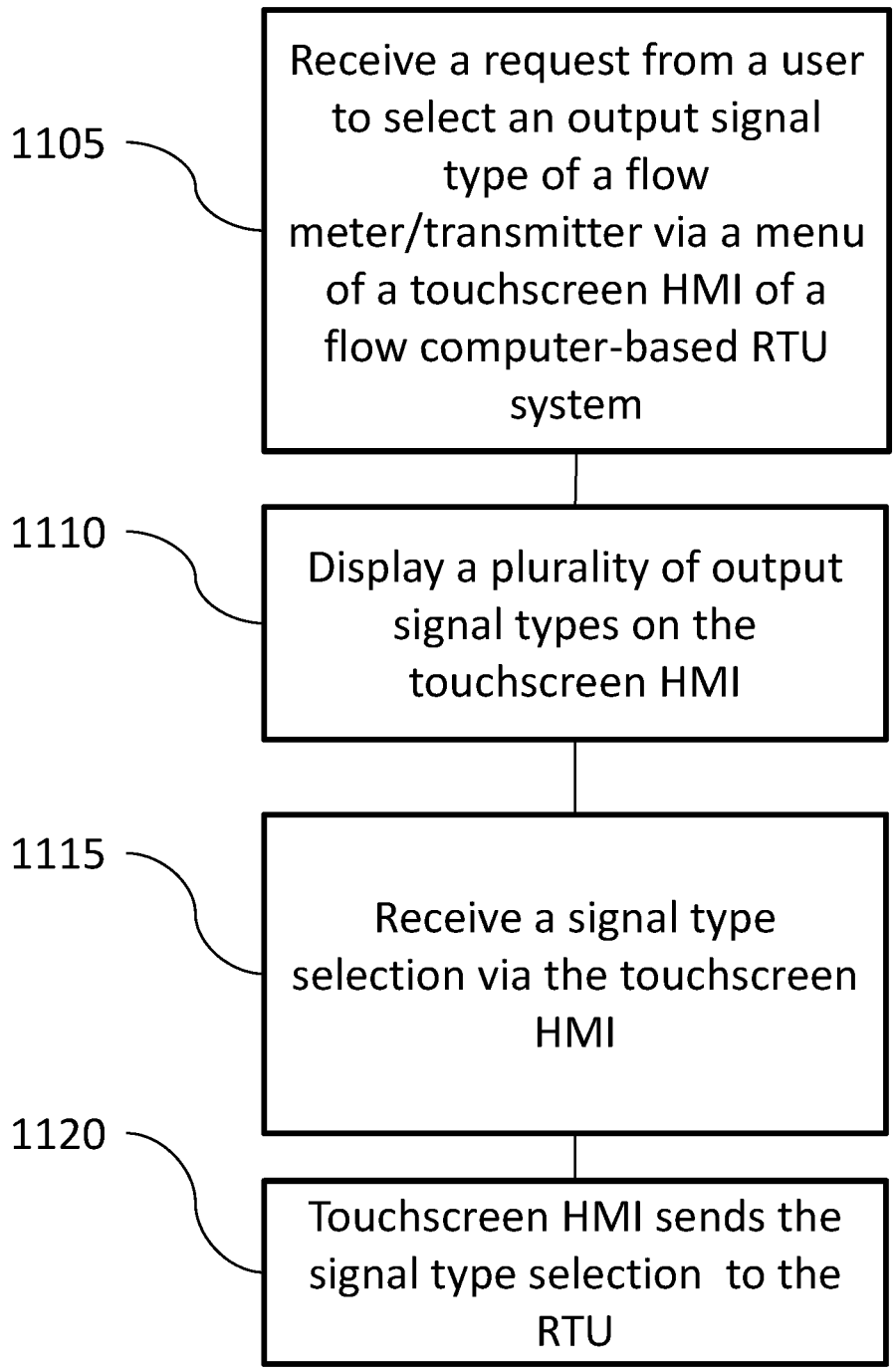
FIG. 11 illustrates a flow diagram of a method for selecting an output signal type of a flow transmitter via a touchscreen HMI of a flow computer in accordance with implementations of various techniques described herein.

FIG. 11 illustrates a flow diagram of a method 1100 for selecting an output signal type of a flow transmitter via a touchscreen HMI of the RTU in accordance with implementations of various techniques described herein. It should be understood that while method 1100 indicates a particular order of execution of operations, in some implementations, certain portions of the operations might be executed in a different order. Further, in some implementations, additional operations or blocks may be added to the method 1100. Likewise, some operations or blocks may be omitted.

At block 1105, a request to select an output signal type of a flow meter/transmitter is received from a user via a menu of a touchscreen HMI of the RTU. At block 1110, a plurality of output signal types is displayed on the touchscreen HMI. At block 1115, a signal type selection is received via the touchscreen HMI. At block 1120, the touchscreen HMI sends the signal type selection to the RTU.

The HMI described herein is designed to accommodate any user, e.g., for use in selecting devices that are used to measure gas flow. The instruments that measure gas flow are connected to the pipeline. The HMI described herein is designed to be equipment agnostic. The firmware is designed so that the flow computer, e.g., RTU, can adapt to whatever equipment is used in the network.

Figure 12:
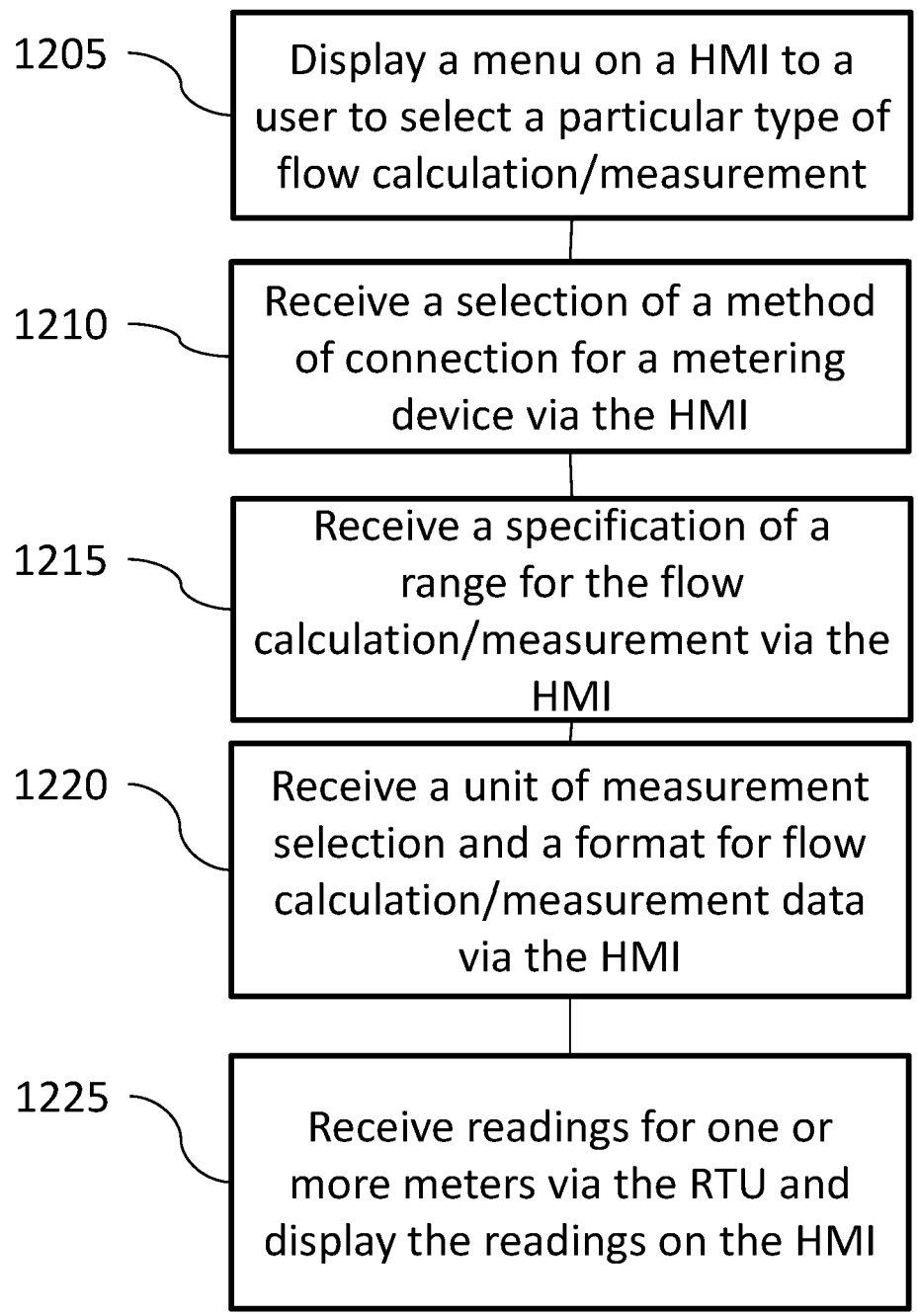
FIG. 12 illustrates a flow diagram of a method for configuring a flow calculation/measurement and a connection method in accordance with implementations of various techniques described herein.

FIG. 12 illustrates a flow diagram of a method 1200 for configuring a flow calculation/measurement and a connection method via a touchscreen HMI of the RTU in accordance with implementations of various techniques described herein. It should be understood that while method 1200 indicates a particular order of execution of operations, in some implementations, certain portions of the operations might be executed in a different order. Further, in some implementations, additional operations or blocks may be added to the method 1200. Likewise, some operations or blocks may be omitted.

At block 1205, a menu on the HMI is displayed to a user. The menu allows a user to select a particular type of flow calculation/measurement. The menu is displayed to the user to select a particular type of flow calculation/measurement (flow rate, temperature or pressure). The menu is displayed on the touchscreen HMI that is either disposed within the same housing as the RTU or located remotely from the RTU.

At block 1210, a selection of a method of connection for a metering device is received via the HMI. In one implementation, the HMI allows the user to select the method of connection of the metering devices. Example connection methods include, but are not limited to: electrical (e.g., current loop), communications (e.g., Modbus RS485 serial), and wireless (integrated Wireless Device Manager). Selection may be made by tapping selections on the touchscreen. The connection methods can be reconfigured at will, without the need for additional hardware or software.

As described above, the HMI may include an integrated Wireless Device Manager (WDM). Previously, connecting wireless devices to a flow computer required additional external hardware and integration labor. In addition, using prior art methods required complicated field-reprogramming if/when existing meters were changed for different meter types. Using an integrated Wireless Device Manager provides the ability to easily provide a wireless connection between the metering devices and the RTU.

In one implementation, the onscreen menu of the HMI provides pre-programmed connection profiles for a plurality of devices, e.g., various metering devices. A user of the onscreen menu of the HMI is not required to know or specify any details about the meter in order to connect the device to the RTU using the HMI. For example, upon choosing a "Use Flow Meter" option for a particular type/brand of flow meter, the flow computer automatically configures the connection (e.g., via Modbus RS485 serial or other applicable connection type) and begin requesting the appropriate information from pre-programmed register numbers of the RTU. In one implementation, this is a wizard/macro type of feature.

The Highway Addressable Remote Transducer over Internet Protocol (HART-IP) protocol is a global standard for sending and receiving digital information across IP networks between smart devices and control or monitoring systems. HART-IP can be used to build a database of various meters' profiles using a flow computer. In one implementation, using the HART-IP protocol, a user may import numerous device profiles (e.g., "HART DD Files") into the RTU to extend the RTUs internal database of meter connection/communication profiles when using wireless communications. In one implementation, this operation may be done remotely, e.g., using wireless communications.

In the prior art, making changes to a meter connection method is considered too complex to be handled entirely from a local HMI. Typically, these changes to the meter connection method are handled by an external laptop and software. The present flow computer maintains an internal database of commonly used parameters and configuration combinations. These parameters and configuration combinations streamline the process of making changes to the meter connection method and are similar in operation to a wizard/macro.

At block 1215, a specification of a range for the flow calculation/measurement is received via the HMI. The user specifies a range for one or more measurements (e.g., pressure of liquid—0 to 100 psi) for the flow computer using the touchscreen HMI. The selection is received/made on the touchscreen HMI. The range settings, e.g., Min—0 and Max—100, can be made/changed on the fly without the need for an external laptop with proprietary software. In addition, some users may find the present system so intuitive that a user manual is unnecessary.

In one implementation, the method at blocks 1205, 1210 and 1215 are repeated for each flow calculation/measurement type. For example, if pressure parameters are initially configured, temperature and flow rate parameters would subsequently be configured.

At block 1220, a unit of measurement selection and a format for flow calculation/measurement data is received via the HMI. The user may select the unit of measurement in which the parameter is to be displayed, e.g., imperial or metric, gallons per minute/day, etc.

At block 1225, readings for one or more meters are received via the RTU and displayed on the HMI touchscreen.

Computing System

Implementations of various technologies described herein may be operational with numerous general purpose or special purpose computing system environments or configurations. Examples of well-known computing systems, environments, and/or configurations that may be suitable for use with the various technologies described herein include, but are not limited to, oil and gas monitoring systems, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computer, and the like.

Various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Various technologies described herein may be implemented in computer-executable instructions, such as program modules, being executed by a computer. Generally, program modules include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

Figure 13:
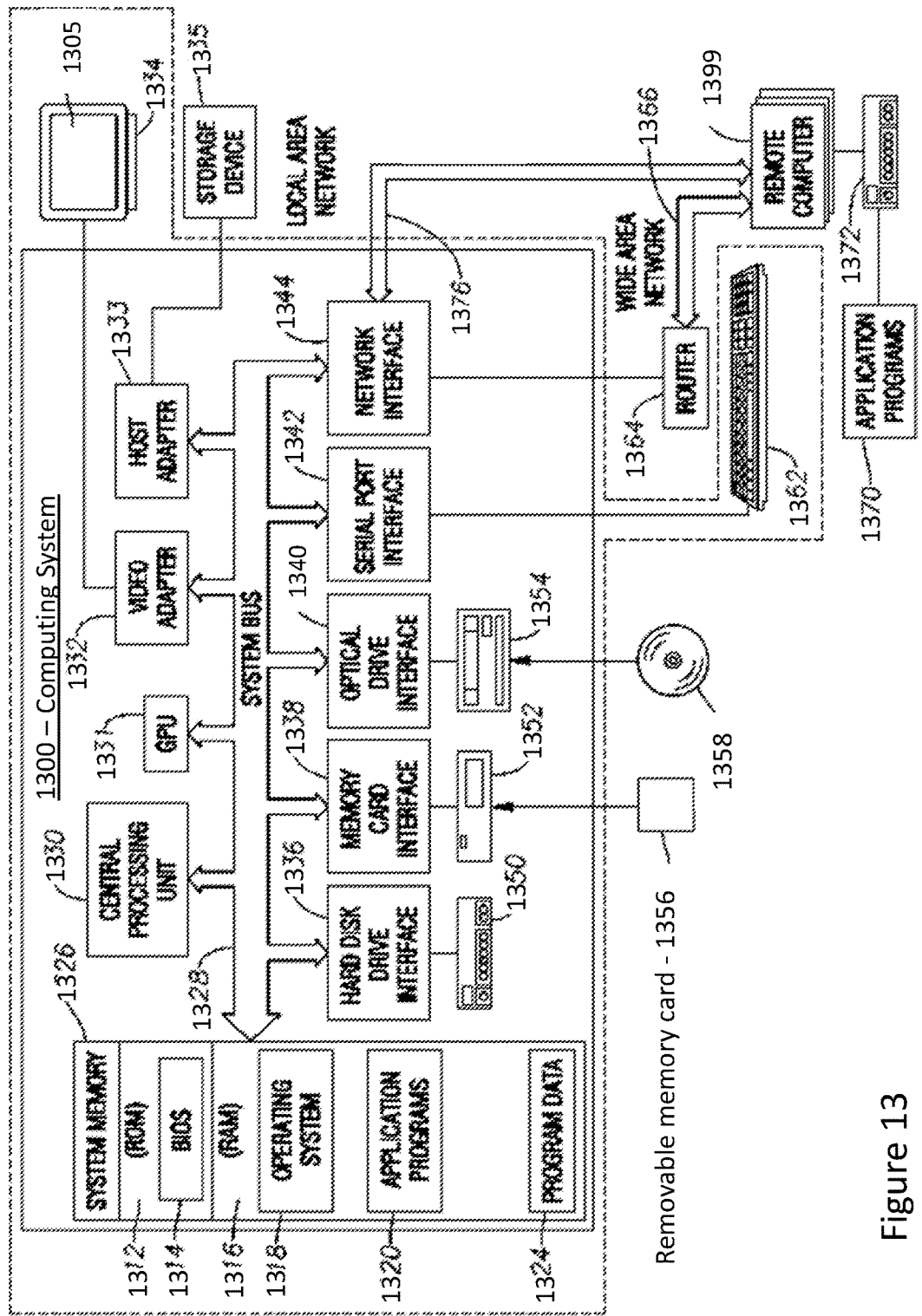
FIG. 13 illustrates a computing system in accordance with implementations of various techniques described herein.

FIG. 13 illustrates a schematic diagram of the HMI 110, 305, 510 or RTU 310, 515 having a computing system 1300 in accordance with implementations of various techniques described herein. The computing system 1300 may be a conventional desktop, a handheld device, a controller, a personal digital assistant, a server computer, an electronics device/instrument, a laptop, or a tablet. It should be noted, however, that other computer system configurations may be used.

The computing system 1300 may include a central processing unit (CPU) 1330, a system memory 1326, a graphics processing unit (GPU) 1331 and a system bus 1328 that couples various system components including the system memory 1326 to the CPU 1330. Although only one CPU 1330 is illustrated in FIG. 13, it should be understood that in some implementations the computing system 1300 may include more than one CPU 1330.

The CPU 1330 can include a microprocessor, a microcontroller, a processor, a programmable integrated circuit, or a combination thereof. The CPU 1330 can comprise an off-the-shelf processor such as a Reduced Instruction Set Computer (RISC), including an Advanced RISC Machine (ARM) processor, or a Microprocessor without Interlocked Pipeline Stages (MIPS) processor, or a combination thereof. The CPU 1330 may also include a proprietary processor. The CPU 1330 may include a multi-core processor.

The GPU 1331 may be a microprocessor specifically designed to manipulate and implement computer graphics. The CPU 1330 may offload work to the GPU 1331. The GPU 1331 may have its own graphics memory, and/or may have access to a portion of the system memory 1326. As with the CPU 1330, the GPU 1331 may include one or more processing units, and each processing unit may include one or more cores.

The CPU 1330 may provide output data to a GPU 1331. The GPU 1331 may generate graphical user interfaces that present the output data. The GPU 1331 may also provide objects, such as menus, in the graphical user interface. A user may provide inputs by interacting with the objects. The GPU 1331 may receive the inputs from interaction with the objects and provide the inputs to the CPU 1330. A video adapter 1332 may be provided to convert graphical data into signals for a monitor 1334. The monitor 1334 includes a screen 1305. The screen 1305 can be sensitive to heat or touching (now collectively referred to as a "touch screen"). In one implementation, the host computer 1399 may not include a monitor 1334. In one implementation, the CPU 1330 may perform the tasks of the GPU.

The system bus 1328 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral device Interconnect (PCI) bus also known as Mezzanine bus. The system memory 1326 may include a read only memory (ROM) 1312 and a random access memory (RAM) 1316. A basic input/output system (BIOS) 1314, containing the basic routines that help transfer information between elements within the computing system 1300, such as during start-up, may be stored in the ROM 1312.

The computing system 1300 may further include a hard disk drive interface 1336 for reading from and writing to a hard disk 1350, a memory card reader 1352 for reading from and writing to a removable memory card 1356, and an optical disk drive 1354 for reading from and writing to a removable optical disk 1358, such as a CD ROM or other optical media. The hard disk 1350, the memory card reader 1352, and the optical disk drive 1354 may be connected to the system bus 1328 by a hard disk drive interface 1336, a memory card reader interface 1338, and an optical drive interface 1340, respectively. The drives and their associated computer-readable media may provide nonvolatile storage of computer-readable instructions, data structures, program modules and other data for the computing system 1300.

Although the computing system 1300 is described herein as having a hard disk, a removable memory card 1356 and a removable optical disk 1358, it should be appreciated by those skilled in the art that the computing system 1300 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, including a Solid State Disk (SSD), CD-ROM, digital versatile disks (DVD), or other optical storage, magnetic cassettes, magnetic tape, magnetic disk storage or other magnetic storage devices, or any other medium which can be used to store the desired information and which can be accessed by the computing system 1300. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 1300 may also include a host adapter 1333 that connects to a storage device 1335 via a small computer system interface (SCSI) bus, a Fiber Channel bus, an eSATA bus, or using any other applicable computer bus interface. The computing system 1300 can also be connected to a router 1364 to establish a wide area network (WAN) 1366 with one or more remote computers 1399. The router 1364 may be connected to the system bus 1328 via a network interface 1344. The remote computers 1399 can also include hard disks 1372 that store application programs 1370.

In another implementation, the computing system 1300 may also connect to one or more remote computers 1399 via local area network (LAN) 1376 or the WAN 1366. When using a LAN networking environment, the computing system 1300 may be connected to the LAN 1376 through the network interface or adapter 1344. The LAN 1376 may be implemented via a wired connection or a wireless connection. The LAN 1376 may be implemented using Wi-Fi technology, cellular technology, or any other implementation known to those skilled in the art. The network interface 1344 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 1399. It will be appreciated that the network connections shown are exemplary and other means of establishing a communications link between the computer systems may be used. The network interface 1344 may also include digital cellular networks (e.g., GSM), Bluetooth, or any other wireless network interface.

A number of program modules may be stored on the hard disk 1350, memory card 1356, optical disk 1358, ROM 1312 or RAM 1316, including an operating system 1318, one or more application programs 1320, and program data 1324. In certain implementations, the hard disk 1350 may store a database system. The database system could include, for example, recorded points. The database system may also include software and/or a software version list or file. The database system may further include a reporting file that captures data, e.g., a snapshot of data. The application programs 1320 may include various mobile applications ("apps") and other applications configured to perform various methods and techniques described herein. The operating system 1318 may be any suitable operating system that may control the operation of a networked personal or server computer.

A user may enter commands and information into the computing system 1300 through input devices such as a keyboard 1362 and pointing device. Other input devices may include a microphone, joystick, game pad, satellite dish, scanner, user input button, or the like. These and other input devices may be connected to the CPU 1330 through a Universal Serial Bus (USB) interface 1342 coupled to system bus 1323, but may be connected by other interfaces, such as a parallel port, Bluetooth, or a game port. A monitor 1305 or other type of display device may also be connected to system bus 1328 via an interface, such as a video adapter 1332 or a wireless interface. In addition to the monitor 1334, the computing system 1300 may further include other peripheral output devices such as speakers and printers.

The discussion above is directed to certain specific implementations. It is to be understood that the discussion above is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

In the above detailed description, numerous specific details were set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A petrochemical measurement system, comprising:
   a remote terminal unit comprising a network data server and configurable using Modbus registers;
   a human machine interface (HMI) comprising an autonomous network data client in communication with the remote terminal unit, the HMI including:
   a memory having configuration parameter software stored thereon; a user interface configured to receive configuration parameter input using the configuration parameter software;
   a processor configured to send configuration parameters received from the user interface of the HMI to the remote terminal unit; and
   a monitoring and/or control system that maintains a configuration library for a plurality of flow meters, wherein the monitoring and/or control system is a supervisory control and data acquisition system (SCADA) or a distributed control system (DCS) coupled to the remote terminal unit, and wherein the remote terminal unit is coupled to the plurality of flow meters;

wherein the human machine interface is integrated in a housing with the remote terminal unit and there is at least one other human machine interface located remotely from the housing;

wherein the human machine interface and the at least one other human machine interface comprise a plurality of human machine interfaces that are simultaneously connected to the remote terminal unit;

wherein the plurality of human machine interfaces are coupled in a client-server fashion with the remote terminal unit;

wherein the monitoring and/or control system configures a new flow meter using information stored in the configuration library;

wherein the monitoring and/or control system configures the new flow meter using contents copied from of a specific block of the Modbus registers in a database of the monitoring and/or control system to the new flow meter.

2. The petrochemical measurement system of claim 1, wherein the monitoring and/or control system configures the new flow meter by pushing configuration data to the new flow meter from the monitoring and/or control system.

3. The petrochemical measurement system of claim 1, wherein the configuration parameter input comprises a particular type of flow calculation and/or measurement.

4. The petrochemical measurement system of claim 3, wherein the particular type of flow calculation and/or measurement includes at least one of a flow rate, a temperature and a pressure.

5. The petrochemical measurement system of claim 1, wherein the configuration parameter input comprises a connection method.

6. The petrochemical measurement system of claim 5, wherein the connection method comprises a current loop.

7. The petrochemical measurement system of claim 5, wherein the connection method comprises Modbus serial communication.

8. The petrochemical measurement system of claim 5, wherein the connection method comprises an integrated wireless device manager.

9. The petrochemical measurement system of claim 1, wherein the configuration parameter software includes pre-programmed connection profiles for a plurality of devices.

10. The petrochemical measurement system of claim 1, wherein the remote terminal unit includes a built-in Highway Addressable Remote Transducer over Internet Protocol (HART-IP) interface.

11. The petrochemical measurement system of claim 1, wherein the human machine interface is programmed separately from the remote terminal unit and operates independently of the remote terminal unit.

12. A petrochemical measurement system, comprising:
a remote terminal unit comprising a network data server, the remote terminal unit configurable using Modbus communications;
a monitoring and/or control system that maintains a configuration library for a plurality of flow meters, wherein the monitoring and/or control system is coupled to the remote terminal unit and is adapted to configure a new flow meter using contents copied from a specific block of Modbus registers in a database of the monitoring and/or control system to the new flow meter, and wherein the remote terminal unit is coupled to the plurality of flow meters; and
a human machine interface comprising an autonomous network data client in communication with the remote terminal unit, the human machine interface having:
a memory having configuration parameter software stored thereon;
a user interface configured to receive configuration parameter input using the configuration parameter software; and
a processor configured to send configuration parameters received from the user interface of the HMI to the remote terminal unit.

13. The petrochemical measurement system of claim 12, wherein the copied contents are pushed to the new flow meter from the monitoring and/or control system.

* * * * *